(12) United States Patent
Gonidec et al.

(10) Patent No.: US 10,266,162 B2
(45) Date of Patent: Apr. 23, 2019

(54) METHOD AND SYSTEM FOR CONTROLLING THE BRAKING OF AN AIRCRAFT EQUIPPED WITH A THRUST-REVERSAL SYSTEM

(71) Applicants: Safran Nacelles, Gonfreville l'Orcher (FR); Safran Landing Systems, Velizy Villacoublay (FR)

(72) Inventors: Patrick Gonidec, Gonfreville l'Orcher (FR); Hakim Maalioune, Gonfreville l'Orcher (FR); François Taillard, Gonfreville l'Orcher (FR); Denis Jontef, Gonfreville l'Orcher (FR); Marie-Laure De-Crescenzo, Gonfreville l'Orcher (FR); Jean-François Hammann, Gonfreville l'Orcher (FR)

(73) Assignees: Safran Nacelles, Gonfreville l'Orcher (FR); Safran Landing Systems, Velizy Villacoublay (FR)

( * ) Notice: Subject to any disclaimer, the term of this patent is extended or adjusted under 35 U.S.C. 154(b) by 0 days.

(21) Appl. No.: 16/010,868

(22) Filed: Jun. 18, 2018

(65) Prior Publication Data

US 2018/0297567 A1     Oct. 18, 2018

Related U.S. Application Data

(63) Continuation of application No. PCT/FR2016/053459, filed on Dec. 15, 2016.

(30) Foreign Application Priority Data

Dec. 18, 2015 (FR) .................................. 15 62825

(51) Int. Cl.
*B60T 8/17* (2006.01)
*B64C 25/42* (2006.01)
(Continued)

(52) U.S. Cl.
CPC ............ *B60T 8/1703* (2013.01); *B60T 8/171* (2013.01); *B60T 8/17616* (2013.01);
(Continued)

(58) Field of Classification Search
CPC .......... B60T 8/1703; B60T 8/171; F02K 1/76; Y02T 50/671
(Continued)

(56) References Cited

U.S. PATENT DOCUMENTS

2008/0154445 A1    6/2008  Goodman et al.
2014/0012437 A1*   1/2014  Jones .................... B60T 8/1703
                                                   701/15
(Continued)

OTHER PUBLICATIONS

International Search Report for International Application PCT/FR2016/053459, dated Mar. 17, 2017.

*Primary Examiner* — Isaac G Smith
(74) *Attorney, Agent, or Firm* — Burris Law, PLLC

(57) ABSTRACT

The present disclosure relates to a method of controlling the braking of an aircraft equipped with a landing gear bearing braked wheels, the aircraft being propelled by jet engines and equipped with a thrust reversal system, the method involving the steps of estimating the grip/adhesion of the braked wheels and activating the thrust-reversal system or modulating the reverse-thrust generated by the thrust-reversal system if this system is already activated, based on the estimated grip/adhesion.

11 Claims, 3 Drawing Sheets

Figure 1:
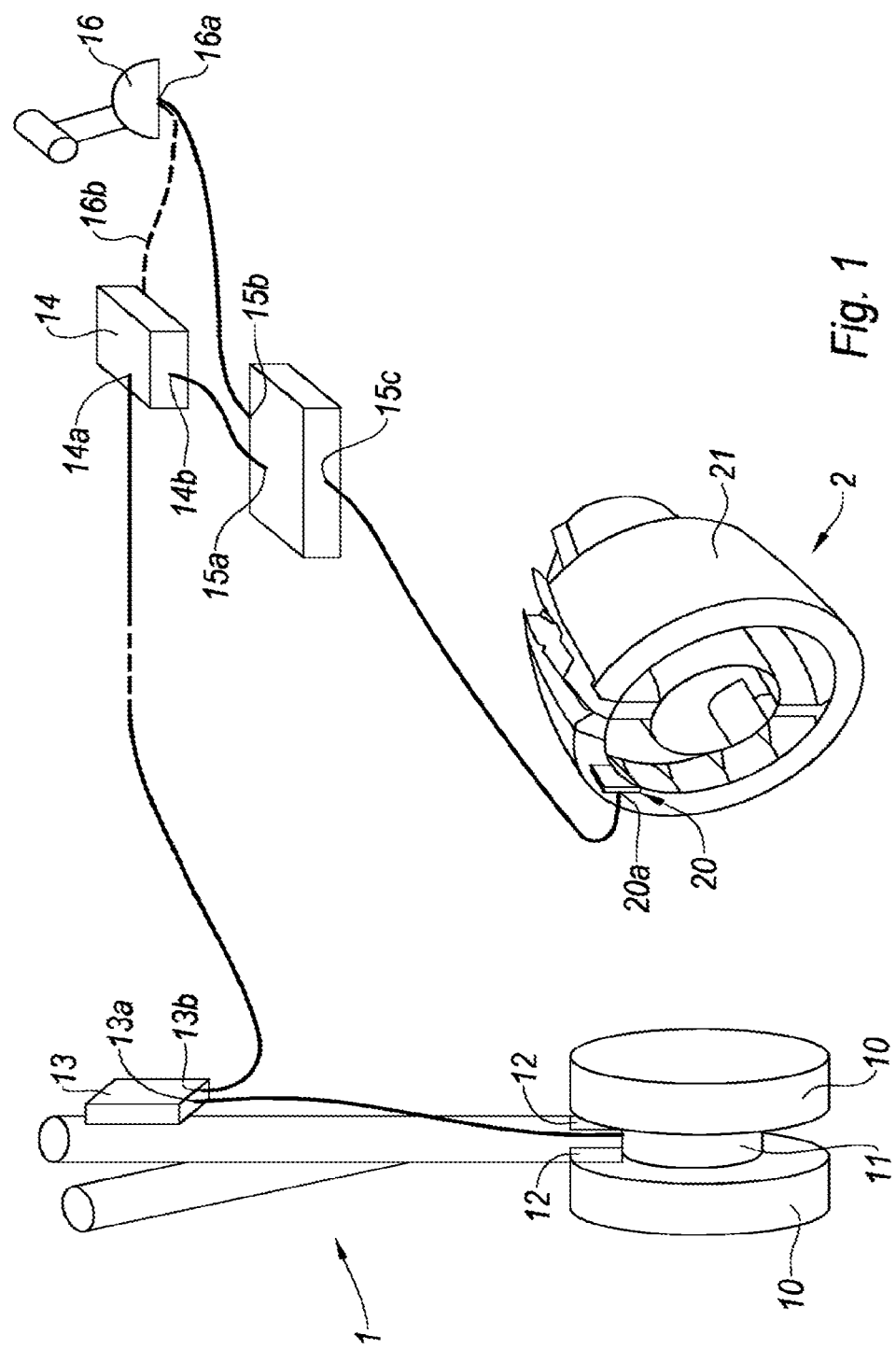

(51) Int. Cl.
    *F02K 1/76*         (2006.01)
    *B60T 8/171*       (2006.01)
    *B60T 8/1761*     (2006.01)

(52) U.S. Cl.
    CPC .............. *B64C 25/42* (2013.01); *F02K 1/76* (2013.01); *F05D 2220/323* (2013.01); *F05D 2260/90* (2013.01); *F05D 2260/901* (2013.01); *F05D 2260/902* (2013.01); *Y02T 50/671* (2013.01)

(58) Field of Classification Search
    USPC .......................................................... 701/3
    See application file for complete search history.

(56) References Cited

U.S. PATENT DOCUMENTS

| | | | |
|---|---|---|---|
| 2014/0257603 A1 | 9/2014 | McKeown et al. | |
| 2015/0316929 A1* | 11/2015 | Veronesi | G05D 1/0083 701/16 |
| 2016/0047333 A1* | 2/2016 | Starovic | F02K 1/72 239/265.19 |

\* cited by examiner

METHOD AND SYSTEM FOR CONTROLLING THE BRAKING OF AN AIRCRAFT EQUIPPED WITH A THRUST-REVERSAL SYSTEM

CROSS-REFERENCE TO RELATED APPLICATIONS

This application is a continuation of International Application No. PCT/FR2016/053459, filed on Dec. 15, 2016, which claims priority to and the benefit of FR 15/62825 filed on Dec. 18, 2015. The disclosures of the above applications are incorporated herein by reference.

FIELD

The present disclosure relates to a method and a system of braking for an aircraft equipped with one or more turbojet engine(s) and equipped with a thrust reverser system.

BACKGROUND

The statements in this section merely provide background information related to the present disclosure and may not constitute prior art.

Most aircraft include landing gear whose essential functions consist, on the one hand, in absorbing a large part of the kinetic energy due to the vertical component of the speed of the aircraft on landing, and, on the other hand, in allowing the aircraft to move on the ground, in particular during the braking phase.

The aircraft braking systems include braking actuators (hydraulic or electromechanical), controlled to apply a braking torque to the wheels of the aircraft aiming to slow it down.

The control of the braking systems generally includes brake assist systems, such as for example an anti-skid system or an automatic braking system (usually called "autobrake" system).

The anti-skid system, or anti-slip protection, allows automatically regulating the braking force applied to each of the braked wheels, in order to prevent any blocking or skid of any of the wheels. To this end, each braked wheel is equipped with a rotation speed sensor, the data measured by these sensors allow detecting the slip of one or more wheel(s).

The automatic braking system allows automatically obtaining the deceleration of the aircraft, the necessary braking force being calculated and controlled by the system, in particular depending on a preselected stopping distance by the pilot. When the automatic braking system is activated, it is no longer necessary that the pilot monitors the braking via the brake pedals (or rudder pedals).

When an aircraft is driven by turbojet engines, a part or all of these turbojet engines are generally equipped with a thrust reverser system. The role of a thrust reverser is, during landing, to improve the braking capability of the aircraft by redirecting forwards at least one part of the thrust generated by the turbojet engine. In this phase, the thrust reverser directs forwardly at least one portion of the ejection flow of the turbojet engine, thereby generating a counter-thrust which is added to the braking of the wheels and the airbrakes of the aircraft.

In the case of bypass turbojet engines, which generate both a hot gas flow (main flow) and a cold air flow (secondary flow), a thrust reverser might act on the two flows, or act only on the cold flow.

In general, the thrust reversers are equipment which undergoes very high mechanical stresses and which must meet strict specifications, in particular in terms of reliability of operation. This equipment is therefore designed accordingly, which negatively impacts the mass and the cost of the propulsion system.

Moreover, when the thrust reverser system of a turbojet engine is activated, the resulting counter-thrust will be more significant as the motor speed will be high. The use of a thrust reverser therefore generally occurs at a high motor speed, for example about 75% of the maximum speed. In some cases, such as for example an emergency landing or an aborted take-off, the motor speed may be even higher. This has the direct consequence of a significant load on the motor, which impacts its service life.

SUMMARY

The present disclosure concerns a control method that allows limiting the load on the thrust reversers, in particular in order to reduce the consumption and the wear of the motors.

To this end, the present disclosure provides a control method of the braking of an aircraft equipped with landing gear carrying braked wheels, the aircraft being propelled by turbojet engines and equipped with a thrust reverser system, the method including the steps of:
  estimating the adhesion of the braked wheels, and
  depending on the estimated adhesion, activating the thrust reverser system, or modulating the counter-thrust generated by the thrust reverser system if it is already activated.

Thus, by allowing the automatic activation of the thrust reversers in case of detection of poor adhesion conditions, the method of the present disclosure allows keeping the use of the thrust reversers for the emergency cases or for the cases of contaminated tracks, while limiting the reaction time. Indeed, the automatic activation of the thrust reversers allows not being dependent on the reaction time of the pilot. This reduces the reaction time of the plane to an unexpected event and therefore increases the safety of the plane maneuvers on the ground. The fuel consumption, and especially the wear of the motors, are reduced, without compromising the safety during landing.

In one form, the thrust reverser system is activated if the estimated adhesion is less than a predetermined threshold.

In another form, the adhesion is estimated depending on a slip rate of the wheels.

In another form, the slip rate of the wheels is determined depending on the measurement of the rotation speed of the braked wheels.

The present disclosure also concerns a braking control system of an aircraft equipped with braked wheels and one or more turbojet engine(s) equipped with a thrust reverser system, the system including:
  a processing unit capable of determining a slip rate of the wheels, and of generating a signal representative of an insufficient adhesion if the slip rate is greater than a predetermined threshold; and
  a control unit capable of receiving the signal generated by the processing unit and, upon receipt of this signal, of controlling the activation of the thrust reverser system.

Thus, the system according to the present disclosure allows a coupling of the braking system of an aircraft and the thrust reverser system. The system in accordance with the present disclosure retrieves the information relating to the quality of the braking and deduces therefrom an automatic actuation order of the thrust reversers if the braking is judged insufficient to meet the instruction given by the pilot or the automatic braking system.

In one form, the control unit is connected to a regulation system of the turbojet engines, or FADEC (Full Authority Digital Engine Command).

In another form, the control unit is integrated into a regulation system of the turbojet engines, or FADEC.

In yet another form, the slip rate of the wheels is determined depending on the information returned by rotation speed sensors of the wheels.

Moreover, the present disclosure also concerns an aircraft equipped with braked wheels and one or more turbojet engine(s) equipped with a thrust reverser system, the aircraft being capable of implementing the method as defined above and/or including a system as defined above.

Further areas of applicability will become apparent from the description provided herein. It should be understood that the description and specific examples are intended for purposes of illustration only and are not intended to limit the scope of the present disclosure.

DRAWINGS

Figure 2:
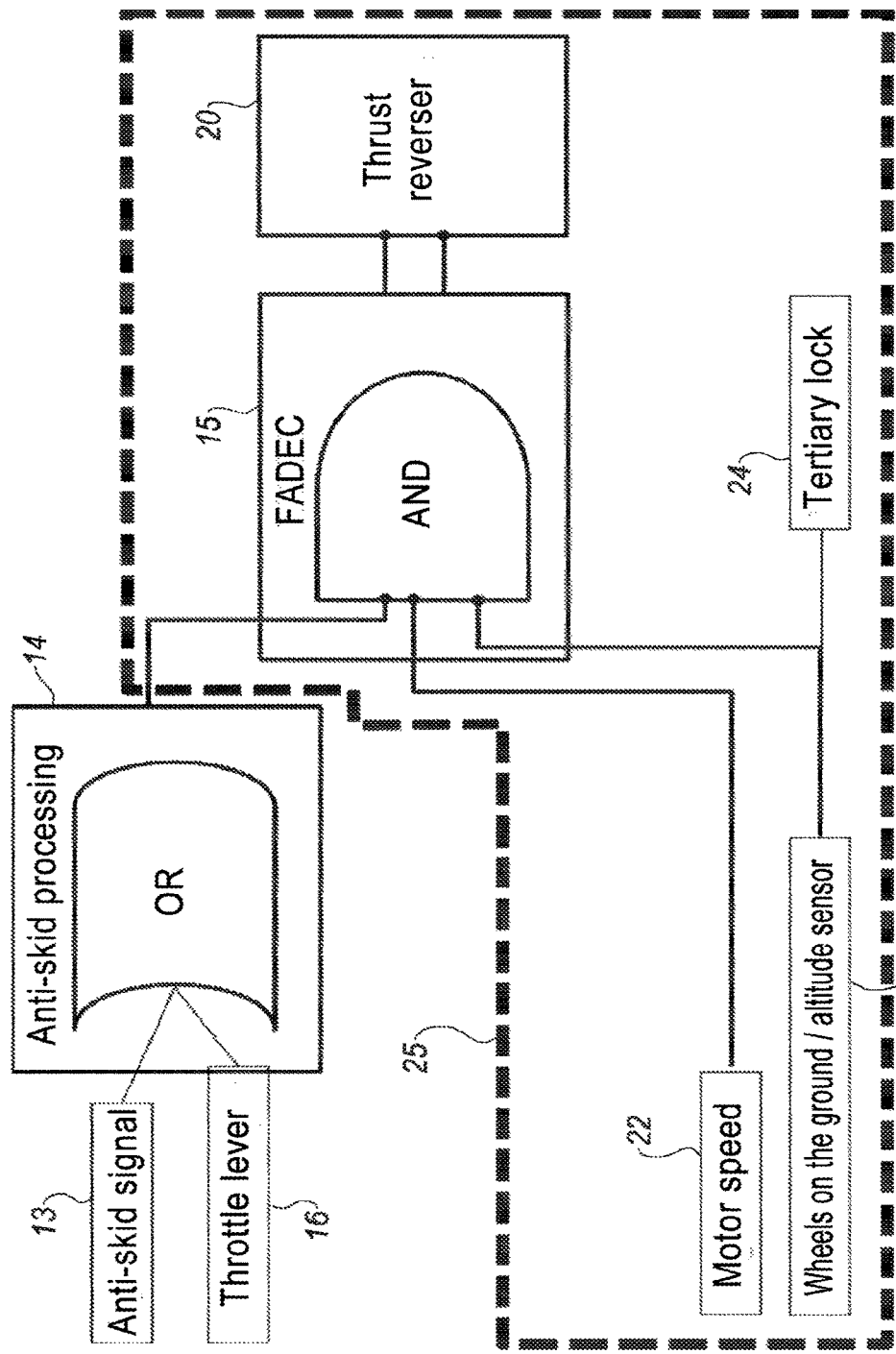
Figure 3:
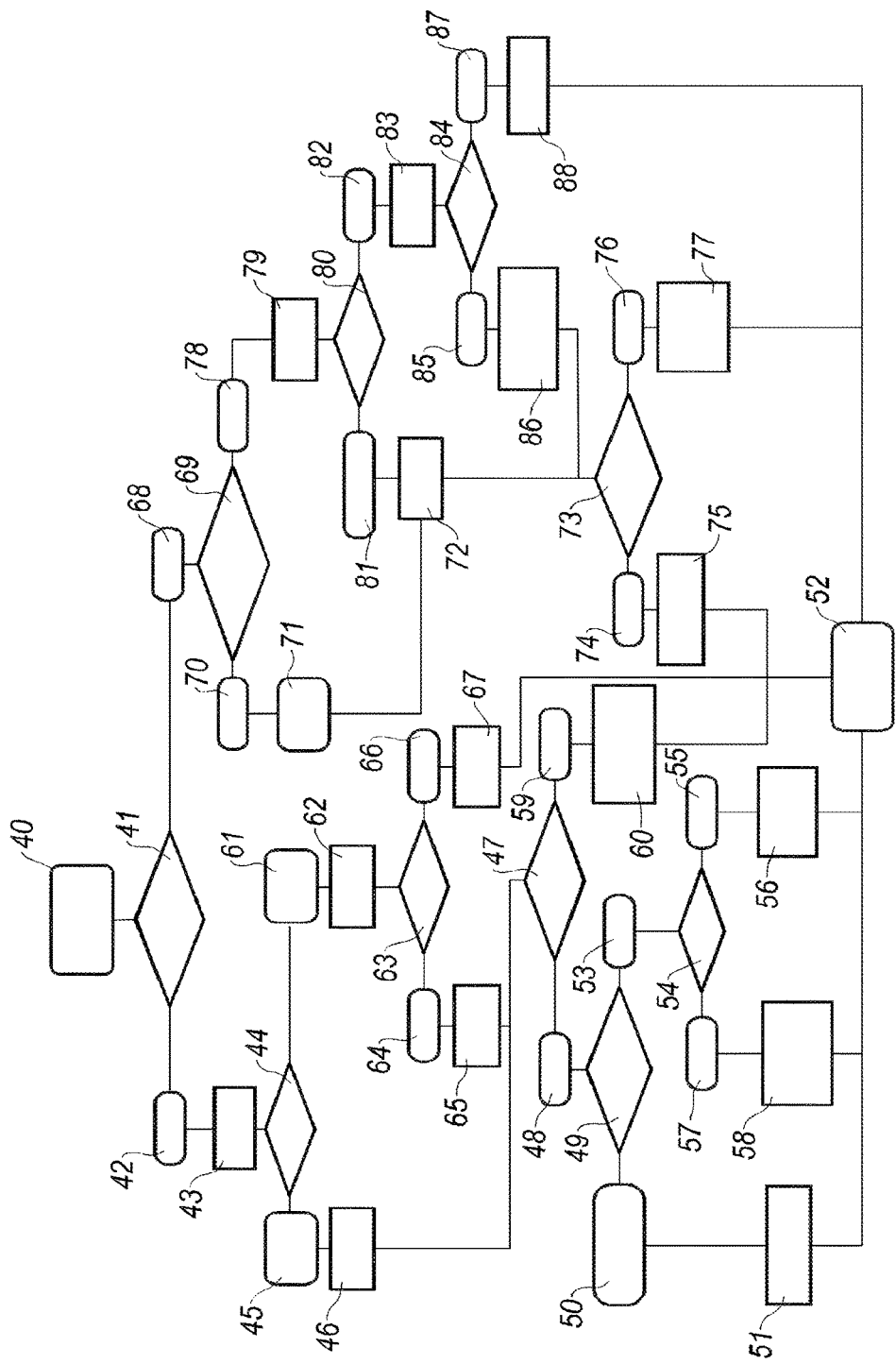

In order that the disclosure may be well understood, there will now be described various forms thereof, given by way of example, reference being made to the accompanying drawings, in which:

FIG. 1 is a diagram showing members of a braking control system in accordance with the present disclosure;

FIG. 2 is a simplified logic diagram of a thrust reversal function in the context of a system in accordance with the present disclosure and/or an implementation of a method in accordance with the present disclosure; and FIG. 3 is a logic diagram of a landing procedure with or without a thrust reverser in the context of a system in accordance with the present disclosure and/or an implementation of a method in accordance with the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows the members of a braking control system in accordance with the present disclosure. These members allowing the implementation of a method in accordance with the present disclosure, and are implanted in particular on subsets of an aircraft, including at least one landing gear 1 and at least one turbojet engine nacelle 2 (only the rear section of which is shown).

The braking control system of an aircraft includes wheels 10, mounted on the landing gear 1, at least one portion of the wheels 20 being braked (that is to say equipped with brakes). The two wheels 10 shown in FIG. 1 are braked and are equipped to this end with brakes 11. The brakes 11 are of the electromechanical or hydraulic type.

Each braked wheel, in the example the two wheels 10, is moreover equipped with a rotation speed sensor 12. The sensors 12 are connected to an input 13a of a processing unit 13. Thus, the data measured by all the sensors 12 are transmitted to the processing unit 13. The processing unit 13 is capable of detecting the slip of one or more braked wheel(s), in particular depending on the data returned by the rotation speed sensors 12. When the processing unit 13 detects the slip of one or more wheel(s), the latter generates a signal representative of the slip of one or more wheels, this signal activating the anti-slip protection. Thus, depending on the slip signal emitted by the processing unit 13, the braking is regulated so as to limit or cancel any slip of the wheels.

In the system in accordance with the present disclosure, the processing unit 13 includes an output 13b connected to an input 14a of a control unit 14. The output 13b allows transmitting to the control unit 14, if desired, a copy of the slip signal. Thus, when the slip of one or more wheel(s) is detected by the processing unit 13, the corresponding slip signal is directly transmitted to the control unit 14. The control unit 14 includes an output 14b directly connected to a first input 15a of the motor regulation system 15, or FADEC 15 ("Full Authority Digital Engine Control" or numerical regulation calculators with full authority of the motors). The FADEC 15 further includes a second input 15b connected to an output 16a of the throttle lever 16, this link allowing transmitting information relating to the position of the throttle lever 16. The FADEC 15 includes an output 15c connected to an input 20a of a control system 20 of a thrust reverser 21.

Thus, thanks to the architecture described above, when a slip signal is emitted by the processing unit 13, this signal is received by the control unit 14. Depending on this signal, the control unit 14 determines an order of activation or, if desired, of modulation of the thrust reverser 21. This order is transmitted to the FADEC 15 which transmits it to the control system 20 of the thrust reverser 21. In the case of a skid 20 identified by the processing unit 13, the control unit 14 thus replaces the pilot's action on the throttle lever 16, and transmits the activation order of the thrust reverser 21 to the FADEC 15. The automatic activation of the thrust reverser system is thus obtained when the slip of one or more wheel(s) is detected. This automatic activation allows carrying out an emergency triggering of the thrust reverser system, in particular when the state of the track, and more particularly its adhesion, proves to be worse than expected and has significant impacts on the braking capability of the aircraft. The automatic activation allows saving precious seconds relative to a manual activation, which would be dependent on the reaction time of the pilot. The system and method in accordance with the present disclosure, by allowing such an automatic activation in case of slip of one or more wheel(s), provides the desired safety, while encouraging the pilot to provide a landing without activating the thrust reversal. Conversely, if the braking conditions are correct, the thrust reverser system is not implemented. Thus, the present disclosure allows reserving the use of the thrust reverser system mainly in emergency cases, and therefore limiting the consumption, and, especially the wear of the motors.

The automatic activation of the thrust reverser will be decided by the system if the measured slip rate (of the braked wheels) is greater than a threshold. This threshold should in particular take into account the distortion of the mechanical torsor of the braking forces induced by a partial or total skid (resultant and moment of the forces on the aircraft). This torsor might be calculated in real time from the slip signals transmitted by each wheel. Two factors will be in particular taken into account: the stability of the path and the path lengthening. Moreover, the processing unit analyzes the traveled distance and the slip rate of the plane, as well as the path lengthening, which will lead the system to take a deployment decision, in particular in case of automatic braking (autobrake), if an excessive distortion relative to the path instruction is observed.

As shown in FIG. 2, the control unit 14 merely replaces the activation by the throttle lever 16. It therefore does not change the structure of the control lines of the thrust reverser against an inopportune deployment, including the logical and mechanical lockings are located either downstream of the FADEC, or in the plane system, with in this latter case the direct control of tertiary lock 24 (or TLS for "Tertiary lock system"), independently of the rest of the system.

On an aircraft equipped with a system in accordance with the present disclosure and/or capable of implementing the method in accordance with the present disclosure, it will be possible to replace or complete the control of the thrust reverser system located at the throttle lever 16 by an emergency triggering button of the thrust reverser system.

In a variant of the system described in FIG. 1, it will be possible to provide that the control unit 14 is connected to the throttle lever 16 (link 16b) and receive therefrom information relating to the position of the throttle lever. This information might allow the control unit 14 to discriminate an aborted take-off of an emergency landing case.

FIG. 2 shows a simplified logic diagram of the activation function of the thrust reverser system in accordance with the present disclosure. In FIG. 2, the processing unit 13, the control unit 14, the FADEC 15 and the control system 20 of the thrust reverser 21 are shown schematically. In the example of FIG. 3, the control unit 14 is connected to both the processing unit 13 and the throttle lever 16. Thus, the control unit 14 emits an activation order of the thrust reverser system if it receives a corresponding signal from the processing unit 13 or the throttle lever 16 (function "OR", corresponding to the Boolean operator "OR"). This order is transmitted to the FADEC 15, which transmits it to the control system 20 if other conditions are fulfilled, in particular if the motor speed 22 is idling, if the wheels 23 have touched the ground and if the tertiary lock 24 is deactivated.

FIG. 2 further shows that the management system of the thrust reversal (that is to say the members located in the dotted frame 25) does not have to be modified to integrate a system in accordance with the present disclosure. Indeed, the members located in the dotted frame 25 of FIG. 2 remain unchanged by the implementation of the present disclosure, the system in accordance with the present disclosure superseding only the pilot's action on the throttle lever. Thereby, it will be noted that, the present disclosure does not change the certification process of the thrust reverser system.

FIG. 3 is a logic diagram of the landing procedure of an aircraft equipped with a system in accordance with the present disclosure, this system having previously activated in flight by the pilot. Indeed, it is recalled that the pilot might choose to deactivate the system in accordance with the present disclosure, which is not treated by FIG. 3.

The landing process shown in FIG. 3 begins during the approach phase (step 40). During this phase, the pilot prepares the landing, which includes preselecting or not the activation of the automatic braking system, or autobrake (step 41).

If the pilot activates the automatic braking system (step 42), then the next step is that of the landing (step 43). During landing, the pilot chooses to activate or not the thrust reverser system (step 44). In the case where the pilot chooses to activate this system, then the thrust reversers are deployed (step 45). The braking is in this case provided by the automatic braking system combined with the thrust reverser system (step 46).

Of course, the pilot always retains a possibility of action during this braking phase (step 47). In the case where the pilot estimates that an action relating to the braking is desired (step 48), the pilot has the choice among two different actions (step 49).

The first type of action (step 50) is a pilot's action on the throttle lever which results in the deactivation of the automatic braking system (alternatively, the pilot's action may be the direct deactivation of the automatic braking system by a dedicated control button). In this case, the end of the braking phase is performed via manual driving of both the gas (management of the thrust reverser system) and the wheel braking (step 51). The following step is the end of the braking phase and therefore of the end of the landing procedure (step 52).

The second action type (step 53) includes a pilot's action on the rudder pedal which is the manual control of the wheel braking. Then two cases might be distinguished, according to the intensity of the pressure exerted by the pilot on the rudder pedal (step 54). If this pressure is considered to be high, that is to say, that it is greater than a predetermined threshold (step 55), then the pilot's action has the effect of deactivating the automatic braking system 15 (step 56). The following step is the end of the braking phase and therefore the end of the landing procedure (step 52).

If the pressure exerted by the pilot is considered not to be strong, that is to say that it is less than the predetermined threshold (step 57), then the pilot's action does not result in the deactivation of the automatic braking system. The end of the braking is then automatically managed for the wheel braking, the system in accordance with the present disclosure being likely to act on the management of gas in case of detection of a slip, that is to say in case of alert of the anti-skid system (step 58). The subsequent step is the end of the braking phase and therefore the end of the landing procedure (step 52).

In the case where, during step 47, the pilot does not perform any action on the braking or thrust reversal controls (step 59), thus the braking is performed automatically. In particular, the motor speed is controlled by the automatic braking system and the anti-skid system (step 60). It will be noted that in the scope of the present disclosure, the system may act on the control of the gas to modify the intensity of the counter-thrust, even if no slip is detected. The subsequent step is the end of the braking phase and therefore the end of the landing procedure (step 52).

When during step 44, the pilot chooses not to activate the thrust reverser system (step 61), then the braking is provided by the automatic braking system alone, without the aid of the thrust reverser system (step 62). Only the wheel braking is therefore implemented, at least at the beginning of the braking sequence (step 63). Indeed, in accordance with the present disclosure, the wheel braking system includes an anti-skid system, capable of detecting the slip of one or more wheel(s) (among the braked wheels). If the anti-skid system emits a signal representative of the occurrence of such a slip (step 64), this signal generates the activation of the thrust reverser system (step 65), at the end of the process described above in relation with FIG. 1. Similarly to step 46, the pilot retains the possibility of acting on the controls, the following step is therefore step 47, already described. If no slip occurs (step 66), then the braking is performed by the automatic braking system, only the wheel braking being implemented (step 67), and until the end of the braking phase. The following step is the end of the braking phase and therefore the end of the landing procedure (step 52).

If, during step 41, the pilot Si does not activate the automatic braking system (step 68), two cases are distinguished according to whether the pilot preselects the activation of the thrust reverser system "to the touch" or not (step 69). In the case where the pilot chooses to preselect this automatic deployment (step 70), then the thrust reverser system is deployed automatically to the touch (step 71), that is to say when the aircraft lands. The braking phase is therefore performed with the activated thrust reverser system (step 72).

However, the pilot retains the possibility to manage the intensity of the counter-thrust by acting or not on the throttle lever (step 73).

If the pilot is acting on the throttle lever (step 74), then the braking is manually managed by the pilot, both the wheel braking and thrust reversal (step 75). The following step is the end of the braking phase and therefore the end of the landing procedure (step 52).

If the pilot does not act on the throttle lever (step 76), then the braking is manually managed by the pilot, only as regards the wheel braking (step 77). The system in accordance with the present disclosure may, however, act on the monitoring of the gas to modify the intensity of the counter-thrust if the anti-skid system detects the slip of one or more wheel(s). The following step is the end of the braking phase and therefore the end of the landing procedure (step 52).

If, during step 69, the pilot chooses not to preselect the automatic deployment of the thrust reverser system (step 78), then the landing is performed without automatic action (step 79), whether for the wheel braking or the thrust reversal. The pilot retains however the possibility to activate or not the thrust reverser system (step 80).

If the pilot activates the thrust reverser system (step 81), then the following step is step 72, already described.

If the pilot does not activate the thrust reverser system (step 82), therefore only the braking is performed without the aid of the thrust reversal (step 83). Only the wheel braking is therefore (manually) implemented, at least at the beginning of the braking sequence (step 84). If the anti-skid system emits a signal representative of the slip of one or more wheel(s) (step 85), this signal generates the activation of the thrust reverser system (step 86), as described above. The next step is then step 73, already described. If no slip is detected by the anti-skid system (step 87), then the braking is performed by wheel braking, only the wheel braking being implemented (step 88), and until the end of the braking phase. The subsequent step is the end of the braking phase and therefore the end of the landing procedure (step 52).

It is recalled that the present description of the present disclosure is given by way of non-limiting example.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A control method for braking an aircraft equipped with landing gear carrying braked wheels, the aircraft being propelled by turbojet engines and equipped with a thrust reverser system, the method comprising:
   estimating an adhesion of the braked wheels; and
   activating the thrust reverser system or modulating a counter-thrust generated by the thrust reverser system if the thrust reverser system is already activated, depending on the estimated adhesion.

2. The method according to claim 1, wherein the thrust reverser system is activated if the estimated adhesion is less than a predetermined threshold.

3. The method according to claim 1, wherein estimating the adhesion depends on a slip rate of the braked wheels.

4. The method according claim 3, wherein the slip rate of the braked wheels is determined based on a measurement of a rotation speed of the braked wheels.

5. An aircraft equipped with braked wheels and one or more turbojet engine(s) equipped with a thrust reverser system, wherein braking is controlled by the method of claim 1.

6. A braking control system of an aircraft equipped with braked wheels and one or more turbojet engine(s) equipped with a thrust reverser system, the braking control system comprising:
   a processing unit operable to determine a slip rate of the braked wheels and to generate a signal representative of an insufficient adhesion if the slip rate is greater than a predetermined threshold;
   a control unit operable to receive the signal generated by the processing unit and control the thrust reverser system based on the signal received.

7. The braking control system according to claim 6, wherein the control unit activates the thrust reverser system when the determined slip rate is greater than a determined threshold.

8. The braking control system according to claim 6, wherein the control unit is connected to a regulation system of the turbojet engines or a FADEC (Full Authority Digital Engine Control).

9. The braking control system according claim 6, wherein the control unit is integrated into a regulation system of the turbojet engines or a FADEC (Full Authority Digital Engine Control).

10. The braking control system according to claim 6, wherein the slip rate of the braked wheels is determined based on information received by rotation speed sensors of the braked wheels.

11. An aircraft equipped with braked wheels and one or more turbojet engine(s) equipped with a thrust reverser system, the aircraft comprising a braking control system according to claim 6.

* * * * *